(12) United States Patent
Mantin

(10) Patent No.: US 6,822,944 B1
(45) Date of Patent: Nov. 23, 2004

(54) MANAGEMENT INTERFACE FOR A NETWORK ACCESS MULTIPLEXING SYSTEM

(75) Inventor: Sharon Mantin, Tel Aviv (IL)

(73) Assignee: Orckit Communications Ltd., Tel Aviv (IL)

( * ) Notice: Subject to any disclaimer, the term of this patent is extended or adjusted under 35 U.S.C. 154(b) by 777 days.

(21) Appl. No.: 09/708,845

(22) Filed: Nov. 8, 2000

(51) Int. Cl.[7] .............................................. H04L 12/28
(52) U.S. Cl. .................. 370/254; 370/395.52; 709/221
(58) Field of Search .......................... 370/395.1, 395.5, 370/395.52, 465, 475, 352, 356, 401, 254, 351, 463; 709/220, 221, 222

(56) References Cited

U.S. PATENT DOCUMENTS

| | | | | |
|---|---|---|---|---|
| 5,889,470 A | * | 3/1999 | Kaycee et al. ............... | 370/465 |
| 6,058,445 A | * | 5/2000 | Chari et al. .................. | 709/223 |
| 6,085,245 A | * | 7/2000 | Kaycee et al. ............... | 709/223 |
| 6,181,715 B1 | * | 1/2001 | Phillips et al. ............... | 370/493 |
| 6,219,354 B1 | * | 4/2001 | Fink et al. ................... | 370/463 |
| 6,310,862 B1 | * | 10/2001 | Roy ............................. | 370/260 |
| 6,339,594 B1 | * | 1/2002 | Civanlar et al. ............ | 370/352 |
| 6,404,861 B1 | * | 6/2002 | Cohen et al. ............ | 379/93.01 |
| 6,424,657 B1 | * | 7/2002 | Voit et al. .................... | 370/412 |
| 6,580,727 B1 | * | 6/2003 | Yim et al. ................... | 370/463 |
| 6,597,689 B1 | * | 7/2003 | Chiu et al. .................. | 370/354 |
| 6,628,649 B1 | * | 9/2003 | Raj et al. .................... | 370/360 |
| 6,636,505 B1 | * | 10/2003 | Wang et al. ................. | 370/254 |
| 6,680,904 B1 | * | 1/2004 | Kaplan et al. .............. | 370/217 |

OTHER PUBLICATIONS

Request for Comments (RFC) 1901, Internet Engineering Task Force, www.rfc–editor.org/rfcsearch.html.
IETF RFC 2225, www.rfc–editor.org/rfcsearch.html.
IETF RFC 2515 www.rfc–editor.org/rfcsearch.html.

* cited by examiner

Primary Examiner—Ajit Patel
(74) Attorney, Agent, or Firm—Darby & Darby

(57) ABSTRACT

Communication access apparatus includes a master shelf, including a master switching unit linked to communicate with a high-speed network, and a plurality of slave shelves. Each slave shelf includes ports that serve network subscribers, and further includes a slave switching unit, coupled to communicate with the master switching unit and to multiplex among the ports so as to provide the subscribers with access to the high-speed network. A management station is coupled to communicate with the master shelf and the plurality of slave shelves over a management network in which all of the slave shelves are on a single subnet.

36 Claims, 3 Drawing Sheets

MANAGEMENT INTERFACE FOR A NETWORK ACCESS MULTIPLEXING SYSTEM

CROSS-REFERENCE TO RELATED APPLICATION

This application is related to co-pending U.S. patent application Ser. No. 09/708,841.

FIELD OF THE INVENTION

The present invention relates generally to high-speed data communication systems, and specifically to Digital Subscriber Line systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure. A range of DSL standards have been defined, known generically as "xDSL," wherein the various standards have different data rates and other associated features but share common principles of operation.

DSL subscribers are connected to high-speed networks through Digital Subscriber Line Access Multiplexer (DSLAM) systems. Because of the high cost of network bandwidth, a single DSLAM must typically be designed to serve between 100 and 1000 subscribers and to concentrate their traffic through one or a few high-speed network trunks. The need to serve such a large and potentially variable number of subscribers in the one DSLAM has led to the development of "multi-shelf" access architectures. In the physical implementation of such systems, each of the shelves holds a switching unit and a group of line cards. Each line card has a number of ports that serve network subscribers. Each switching unit links the shelf to the network trunk (either directly or through the switching unit of another shelf) and multiplexes the network connection among the line cards.

In order to reduce maintenance costs, DSLAM systems are typically configured so that, insofar as possible, management and maintenance activities are carried out using a remote management station. Optimally, the management station communicates "in-band" with the switching units, i.e., via the high-speed network. Alternatively, the management station may communicate with the master unit via an "out-of-band" network, such as an Ethernet network, or by a point-to-point (PPP) dial-up connection. The object of this configuration is to minimize the number of service calls that a maintenance engineer or technician must make to the site of the DSLAM.

SUMMARY OF THE INVENTION

It is an object of some aspects of the present invention to provide an improved management network for a high-speed network access multiplexing system, and particularly for a multi-shelf access system.

It is another object of some aspects of the present invention to provide an Internet Protocol (IP) management network for a multi-shelf access system that uses a minimal number of IP addresses.

It is a further object of some aspects of the present invention to provide a network access multiplexing system that is easy to configure and to maintain.

In preferred embodiments of the present invention, a network access multiplexing system comprises multiple shelves, each shelf comprising a switching unit, linked to the network, and one or more line cards, having ports that serve respective network subscribers. The shelves comprise a master shelf, having a master switching unit connected to the network, and a plurality of slave shelves, having slave switching units linked to the network through the master switching unit. The master shelf serves as a gateway for a management network, preferably based on IP, through which one or more remote management stations communicate with the master and slave shelves to perform configuration and maintenance functions. In order to minimize the use of IP addresses and simplify the task of configuring the system on setup and shelf replacement, all of the slave shelves are on a single IP subnet.

There is therefore provided, in accordance with a preferred embodiment of the present invention, communication access apparatus, including:

a master shelf, including a master switching unit linked to communicate with a high-speed network;

a plurality of slave shelves, each slave shelf including ports that serve network subscribers, and further including a slave switching unit, coupled to communicate with the master switching unit and to multiplex among the ports so as to provide the subscribers with access to the high-speed network; and a management station, coupled to communicate with the master shelf and the plurality of slave shelves over a management network in which all of the slave shelves are on a single subnet.

In a preferred embodiment, the master shelf and the plurality of slave shelves belong to a Digital Subscriber Line Access Multiplexing (DSLAM) system, and the high-speed network includes an Asynchronous Transfer Mode (ATM) network. Preferably, the master and slave switching units communicate over ATM lines, and the management network includes an Internet Protocol (IP) network, which is operative over the ATM lines using an IP over ATM protocol. Preferably, the management station communicates with the master shelf over the ATM network. Additionally or alternatively, the management station is linked to the master shelf by an Ethernet link.

Preferably, the slave shelves are arranged in a plurality of daisy chains, over which the slave switching units are coupled to communicate with the master switching unit, wherein each of the slave shelves has an address on the management network within the single subnet that is determined uniquely by an identifying number of the chain in which the shelf is located and a position of the shelf in the chain.

Further preferably, the slave shelves are arranged in a selected topology with respect to the master shelf, and the master switching unit is adapted to analyze the system topology and to assign a respective address on the subnet to each of the slave shelves automatically responsive to the analyzed topology. Most preferably, each of the slave shelves is adapted to recognize its assigned address automatically responsive to a position of the slave shelf in the topology.

There is also provided, in accordance with a preferred embodiment of the present invention, a method for providing communication access, including:

linking a master switching unit on a master shelf to communicate with a high-speed network;

coupling a plurality of slave shelves to the master shelf, so that a slave switching unit on each slave shelf communicates with the master switching unit and multiplexes among subscriber ports on the slave shelf so as to provide the subscribers with access to the high-speed network; and coupling a management station to convey management instructions to the master shelf and the plurality of slave shelves over a management network in which all of the slave shelves are on a single subnet.

There is additionally provided, in accordance with a preferred embodiment of the present invention, communication access apparatus, including:

a master shelf, including a master switching unit linked to communicate with a high-speed network;

a plurality of slave shelves arranged in a given system topology with respect to the master shelf, each of the slave shelves including ports configured to serve network subscribers, and further including a slave switching unit, coupled to communicate with the master switching unit and to multiplex among the ports so as to provide the subscribers with access to the high-speed network, and to receive from the master shelf management messages that are addressed to a network-layer address that is determined uniquely for each of the slave shelves based on the topology; and a management station, coupled to convey the management messages to the master shelf over a management network, responsive to the network-layer address of each of the slave shelves.

There is further provided, in accordance with a preferred embodiment of the present invention, a method for providing communication access, including:

linking a master switching unit on a master shelf to communicate with a high-speed network;

arranging a plurality of slave shelves in a given system topology with respect to the master shelf, so that a slave switching unit on each slave shelf communicates with the master switching unit and multiplexes among subscriber ports on the slave shelf so as to provide the subscribers with access to the high-speed network;

assigning to each slave shelf a unique network-layer address based on the topology, for receiving management instructions from the master switching unit;

conveying the management instructions from a management station to the master shelf over a management network, responsive to the network-layer address of each of the slave shelves.

The present invention will be more fully understood from the following detailed description of the preferred embodiments thereof, taken together with the drawings in which:

DETAILED DESCRIPTION OF PREFERRED EMBODIMENTS

Figure 1:
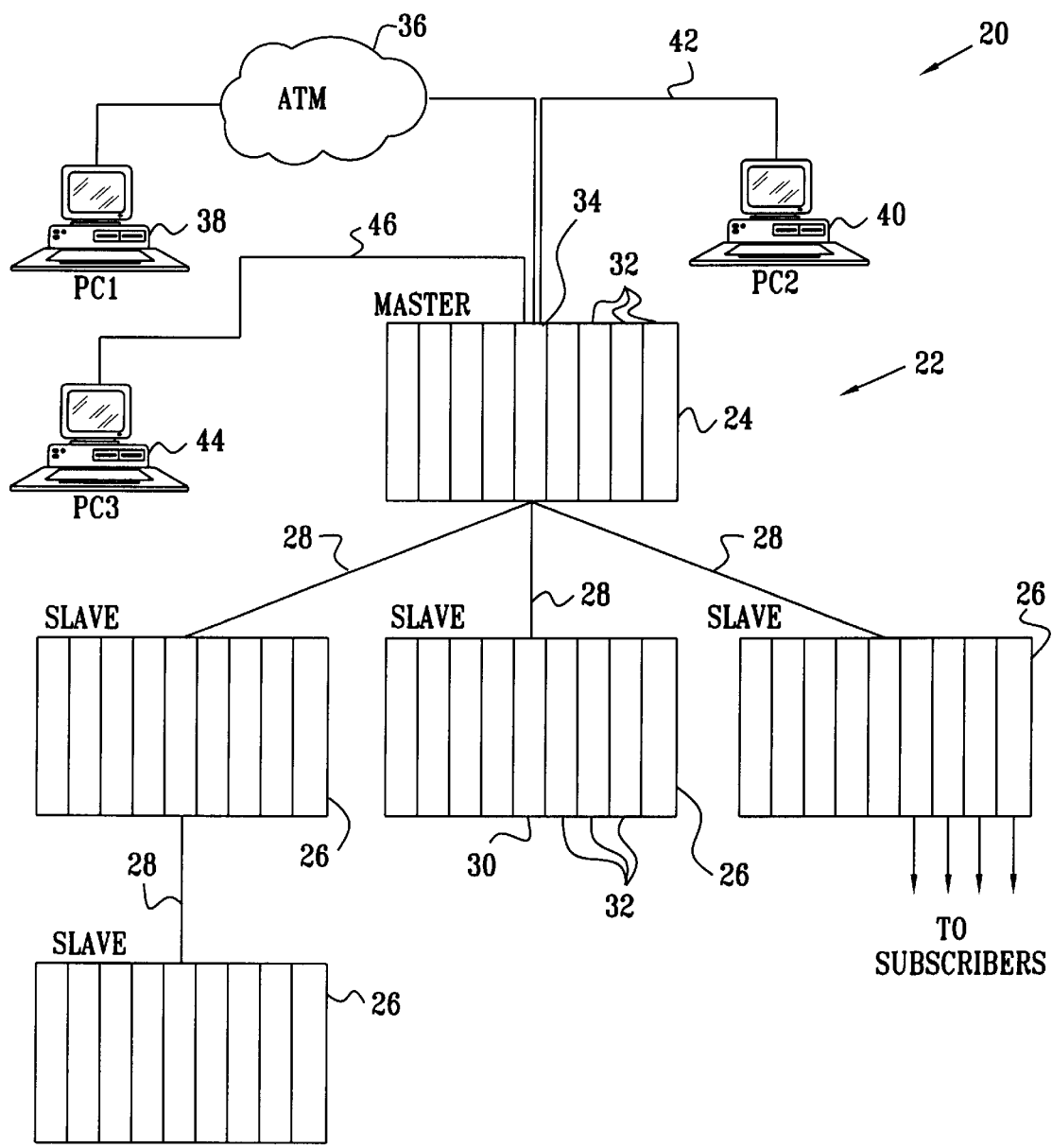
FIG. 1 is a block diagram that schematically illustrates a multi-shelf network access multiplexing system, in accordance with a preferred embodiment of the present invention.

FIG. 1 is a block diagram that schematically illustrates a multi-shelf network access multiplexing system 20, in accordance with a preferred embodiment of the present invention. System 20 is built around a DSLAM 22, which comprises a master shelf 24 coupled to multiple slave shelves 26, which are arranged in a hybrid star/chain configuration. Preferably, slave shelves 26 are arranged in multiple daisy chains, as described in co-pending U.S. patent application Ser. No. 09/472,683, entitled "Bi-Directional Chaining of Network Access Ports," which is assigned to the assignee of the present patent application, and whose disclosure is incorporated herein by reference. For simplicity of illustration, however, FIG. 1 shows only a part of the more complex topology described in the co-pending application.

Master shelf 24 comprises a master switching unit 34 (referred to hereinafter as a master unit), which communicates with a core high-speed network 36, such as an Asynchronous Transfer Mode (ATM) network. The master unit comprises switching equipment that multiplexes the network connection among the multiple slave shelves 26. Typically, the master shelf also includes line cards 32 connected to master unit 34, each line card comprising ports that serve network subscribers. Each of slave shelves 26 comprises its own line cards 32 and a slave switching unit 30 (or slave unit) for multiplexing among them. Communications between master unit 34 and slave units 30 are carried over ATM lines 28. Preferably, each slave shelf has its own hard-coded virtual channel connection (VCC) for this purpose.

Management and maintenance of system 20 are preferably carried out remotely, using one or more of management stations 38, 40 and 44. These stations typically comprise personal computers or workstations. Management station 38 communicates "in-band," via high-speed network 36, with master unit 34 (and through it with slave units 30). Management station 40 communicates with master unit 34 via an "out-of-band" network 42, such as an Ethernet network. Management station 44 communicates with master unit 34 over a point-to-point (PPP) dial-up RS-232 connection 46, which is typically used as a back-up when the usual in-band or out-of-band management communication channel is not functioning.

Figure 2:
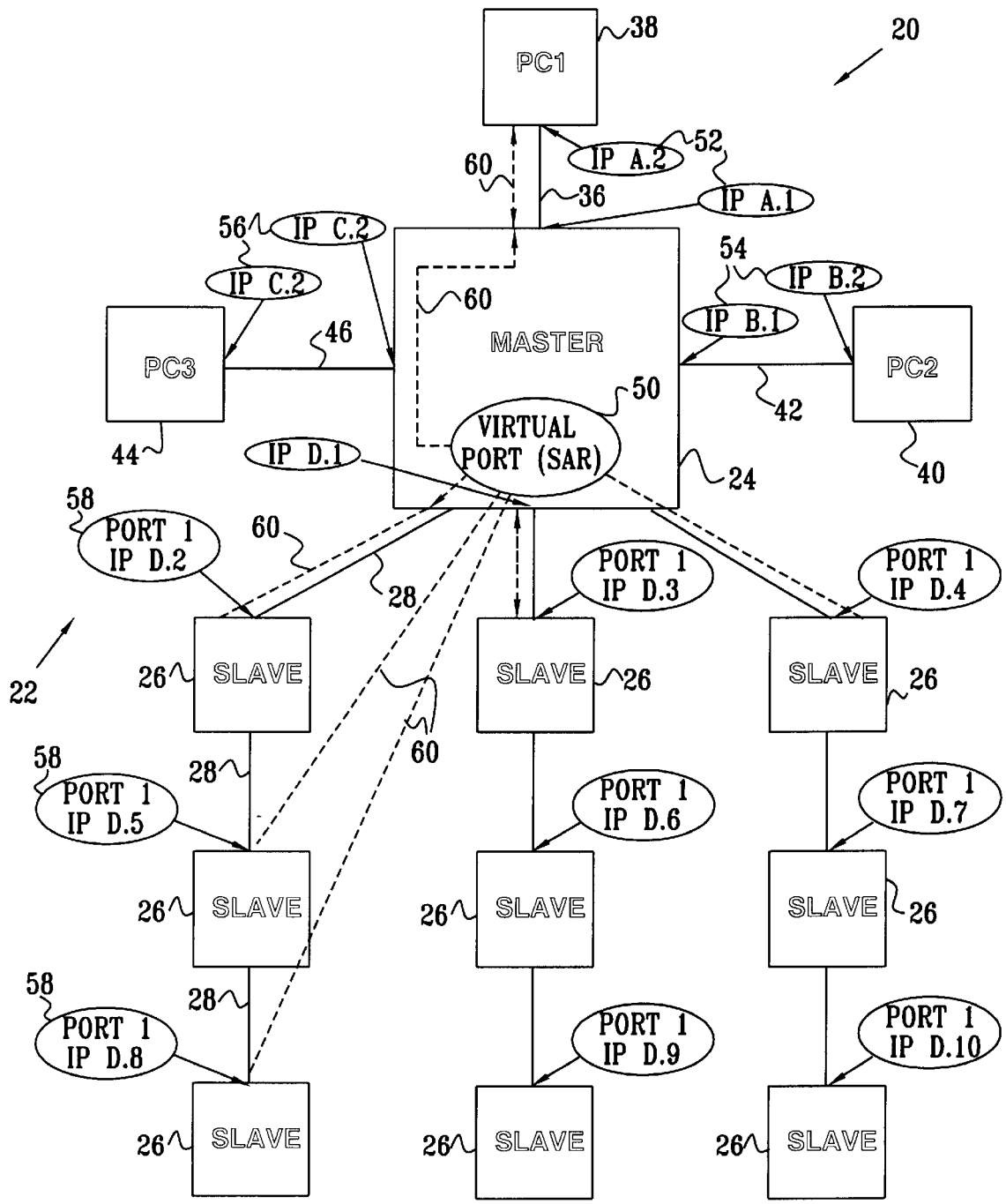
FIG. 2 is a block diagram that schematically illustrates communication channels in the system of FIG. 1, in accordance with a preferred embodiment of the present invention.

FIG. 2 is a block diagram that schematically illustrates communication channels in system 20 that are associated with management functions carried out by stations 38, 40 and/or 44, in accordance with a preferred embodiment of the present invention. The management functions are implemented over an Internet Protocol (IP) network defined within system 20, and preferably use the Simple Network Management Protocol (SNMP), as is known in the art. (SNMP is described, for example, in Request for Comments (RFC) 1901 of the Internet Engineering Task Force, which is incorporated herein by reference. This document is available at www.rfc-editor.org/rfcsearch.html, as are other RFCs mentioned hereinbelow.) For the purpose of management communications, each of shelves 24 and 26 is defined as a separate network element, with its own IP address.

Management communications between master shelf 24 and station 38 and between the master shelf and slave shelves 26 are conducted by means of IP over ATM (IPOA), as described, for example, in IETF RFC 2225, which is incorporated herein by reference. The IPOA communications use permanent virtual connections (PVCs) 60 established for this purpose. Master unit 34 operates a segmentation and reassembly (SAR) driver 50 for converting IP packets into ATM cells and vice versa. Two IPOA virtual ports are opened above the ATM Adaptation Layer Type 5 (AAL5) of the SAR driver: one connecting to in-band management station 38 and the other to slave shelves 26.

Master shelf 24 implements an IP router with up to four ports for the purpose of management communications. The ports serve four respective subnets:

- an in-band management subnet 52 (subnet A) for communication with management station 38;
- an out-of-band management subnet 54 (subnet B) for communication with management station 40;
- a dial-up subnet 56 (subnet C) for communication with management station 44; and
- a slave shelf subnet 58 (subnet D) for communication with slave shelves 26.

All of the slave shelves have their own IP addresses, but share the same subnet and port on master shelf 24. Each slave shelf typically comprises a two-port IP router: one port communicating with the next slave shelf down the respective chain and the other communicating up the chain with the master shelf. On the ATM level, the slave shelves communicate with the master shelf using their respective hard-coded VCCs, as given by the ATM Management Information Base (MIB), described in IETF RFC 2515, which is incorporated herein by reference. These internal VCCs do not use resources of network 36, however, and in fact are transparent to the network.

The size of subnet D is dependent on the number of slave shelves 26 in DSLAM 22. Preferably, the subnet size is a power of two and is at least equal to the number of slave shelves plus two, in order to allow for null and broadcast IP addresses in the subnet. Most preferably, the size of the subnet is set based on the expected maximum number of shelves that will be installed in the DSLAM over the long run. In this way, it will not be necessary to reconfigure the management network if new shelves are added after initial installation of the DSLAM.

As noted above, slave shelves 26 are preferably connected together in multiple, parallel chains, most preferably three such chains as shown in FIG. 2. Each chain has a chain identifier (ID), beginning with ID=0 for the first chain. Each slave shelf is automatically assigned a shelf address (SA), starting from SA=0, depending on its position in the chain. The port on master shelf 24 that communicates with the slave shelves receives IP address D.1 (i.e., address 1 on subnet D). The IP address of each slave shelf on subnet D is then equal to [(SA*number of chains)+chain ID+2]. The shelf IP addresses are preferably set automatically, based on the physical arrangement of the shelves, so that the only parameters that must be configured when a shelf is installed is the chain ID.

Figure 3:
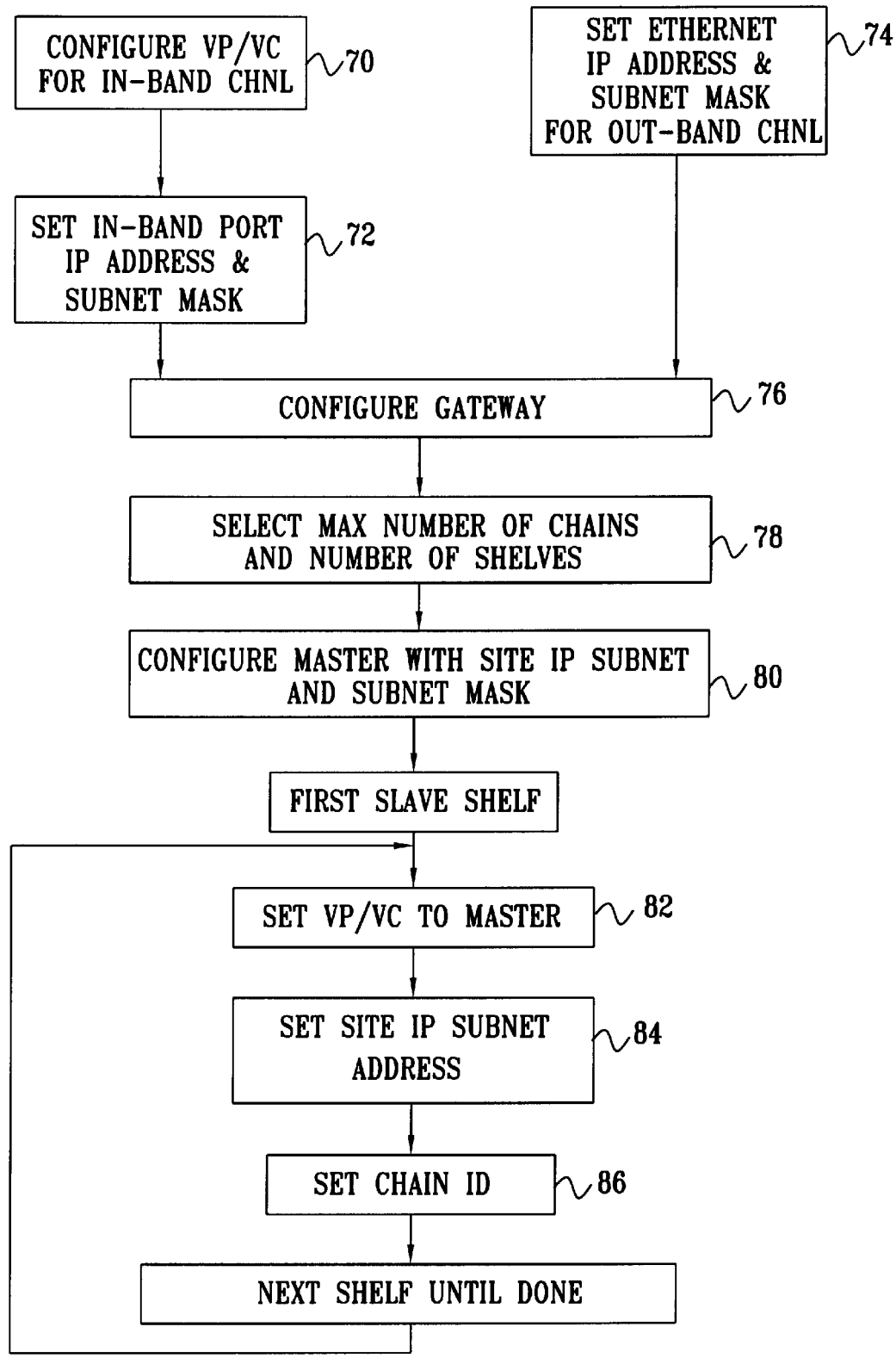
FIG. 3 is a flow chart that schematically illustrates a method for configuring a multi-shelf network access multiplexing system, in accordance with a preferred embodiment of the present invention.

FIG. 3 is a flow chart that schematically illustrates a method for configuring system 20, in accordance with a preferred embodiment of the present invention. For the sake of completeness, a configuration using both in-band management station 38 and out-of-band management station 40 is described hereinbelow. It is not necessary, however, that both management stations be active. Any ports on the IP router of master shelf 24 that are not used do not need to be configured.

For use of in-band station 38, set-up begins with configuration of the virtual path and virtual channel (VP/VC) over ATM network 36 for communication with master shelf 24, at an ATM configuration step 70. The IP port and IP address of station 38 are set at an IP configuration step 72. The IP address includes the IP subnet of station 38 (subnet A in the embodiment of FIG. 2). A suitable subnet mask is set for this purpose.

Master shelf set-up for communication with out-of-band station 40 takes place at an Ethernet set-up step 74. The IP address of station 40 is set, and a suitable subnet mask is assigned, preferably the default Ethernet subnet mask of 255.255.255.252. Station 40 is likewise programmed with the IP address and subnet mask of the Ethernet port on master shelf 24 and routing information for slave shelves 26.

Configuration of the master shelf itself begins with a gateway configuration step 76. The default gateway for management communications in the master shelf routing table is set to the subnet of either in-band station 38 or out-of-band station 42. Static routes are defined to the other ports of the router. In order to set the site subnet and subnet mask for communication with slave shelves 26, the maximum number of chains and maximum number of shelves in each chain should first be determined, as described above, at a maximum selection step 78. On this basis, the site subnet address is chosen (subnet D), and a suitable subnet mask is set, at a site IP configuration step 80. For a typical configuration of three chains, with up to seven shelves in a chain, the subnet mask should be set to 255.255.255.224.

After configuring master shelf 24, each of slave shelves 26 is configured in turn. Preferably, in order to conserve IP addresses when installing the slave shelves, the first shelf (SA=0) is installed in all of the chains before installing the second shelf in any one of the chains. Assuming in-band station 38 is being used to manage DSLAM 22, the VP/VC is set for each shelf, at a shelf ATM setup step 82. The default values of the VP and VC are Vpi=1 and Vci=1. Each slave shelf is configured with the site IP subnet address and subnet mask, at a shelf IP setup step 84. Once the shelf is also programmed with its chain ID, at a chain setup step 86, its complete IP address is determined automatically, as described above.

When all of the chains have been configured in this manner, system 20 is ready for operation. Substantially no further configuration steps are required beyond the small number of simple steps described above. When a shelf is replaced or added to the system, only that shelf must be configured, by means of steps 82, 84 and 86, while the rest of the system continues to operate without reconfiguration.

While the preferred embodiment described hereinabove relates specifically to DSLAM 22 and to communications over ATM network 36, the principles of the present invention are likewise applicable to management of other types of multi-shelf access systems, for use with networks of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Communication access apparatus, comprising:
   a master shelf, comprising a master switching unit linked to communicate with a high-speed network;
   a plurality of slave shelves, each slave shelf comprising ports that serve network subscribers, and further comprising a slave switching unit, coupled to communicate with the master switching unit and to multiplex among the ports so as to provide the subscribers with access to the high-speed network; and a management station, coupled to communicate with the master shelf and the plurality of slave shelves over a management network in which all of the slave shelves are on a single subnet, so as to perform configuration and maintenance functions on one or more of the slave shelves.

2. Apparatus according to claim 1, wherein the master shelf and the plurality of slave shelves belong to a Digital Subscriber Line Access Multiplexing (DSLAM) system.

3. Apparatus according to claim 1, wherein the high-speed network comprises an Asynchronous Transfer Mode (ATM) network.

4. Apparatus according to claim 3, wherein the master and slave switching units communicate over ATM lines.

5. Apparatus according to claim 4, wherein the management network comprises an Internet Protocol (IP) network, which is operative over the ATM lines using an IP over ATM protocol.

6. Apparatus according to claim 3, wherein the management station communicates with the master shelf over the ATM network.

7. Apparatus according to claim 3, wherein the management station is linked to the master shelf by an Ethernet link.

8. Apparatus according to claim 1, wherein the slave shelves are arranged in a plurality of daisy chains, over which the slave switching units are coupled to communicate with the master switching unit.

9. Apparatus according to claim 8, wherein each of the slave shelves has an address on the management network within the single subnet that is determined uniquely by an identifying number of the chain in which the shelf is located and a position of the shelf in the chain.

10. Apparatus according to claim 1, wherein the management network comprises an Internet Protocol (IP) network.

11. Apparatus according to claim 1, wherein the slave shelves are arranged in a selected topology with respect to the master shelf, and wherein the master switching unit is adapted to analyze the system topology and to assign a respective address on the subnet to each of the slave shelves automatically responsive to the analyzed topology.

12. Apparatus according to claim 11, wherein each of the slave shelves is adapted to recognize its assigned address automatically responsive to a position of the slave shelf in the topology.

13. A method for providing communication access, comprising:

linking a master switching unit on a master shelf to communicate with a high-speed network;

coupling a plurality of slave shelves to the master shelf, so that a slave switching unit on each slave shelf communicates with the master switching unit and multiplexes among subscriber ports on the slave shelf so as to provide the subscribers with access to the high-speed network; and coupling a management station to convey management instructions to the master shelf and the plurality of slave shelves over a management network in which all of the slave shelves are on a single subnet, so as to perform configuration and maintenance functions on one or more of the slave shelves.

14. A method according to claim 13, wherein the master shelf and the plurality of slave shelves belong to a Digital Subscriber Line Access Multiplexing (DSLAM) system.

15. A method according to claim 13, wherein the high-speed network comprises an Asynchronous Transfer Mode (ATM) network.

16. A method according to claim 15, coupling the plurality of slave shelves comprises coupling the slave shelves to the master shelf over ATM lines.

17. A method according to claim 16, wherein the management network comprises an Internet Protocol (IP) network, and wherein coupling the management station to convey the management instructions comprises conveying the instructions over the ATM lines using an IP over ATM protocol.

18. A method according to claim 15, wherein coupling the management station to convey the management instructions comprises coupling the management station to communicate with the master shelf over the ATM network.

19. A method according to claim 15, wherein coupling the management station to convey the management instructions comprises coupling the management station to communicate with the master shelf over an Ethernet link.

20. A method according to claim 13, wherein coupling the plurality of slave shelves comprises arranging the slave shelves in a plurality of daisy chains, over which the slave switching units communicate with the master switching unit.

21. A method according to claim 20, wherein coupling the management station to convey the management instructions comprises uniquely determining for each of the slave shelves an address within the single subnet on the management network based on an identifying number of the chain in which the shelf is located and a position of the shelf in the chain.

22. A method according to claim 13, wherein the management network comprises an Internet Protocol (IP) network.

23. A method according to claim 13, wherein coupling the plurality of slave shelves comprises arranging the slave shelves in a selected topology with respect to the master shelf, and wherein coupling the management station comprises analyzing the system topology automatically so as to assign a respective address on the subnet to each of the slave shelves responsive to the analyzed topology.

24. Communication access apparatus, comprising:

a master shelf, comprising a master switching unit linked to communicate with a high-speed network;

a plurality of slave shelves arranged in a given system topology with respect to the master shelf, each of the slave shelves comprising ports configured to serve network subscribers, and further comprising a slave switching unit, coupled to communicate with the master switching unit and to multiplex among the ports so as to provide the subscribers with access to the high-speed network, and to receive, from the master shelf, management messages that are addressed to a network-layer address that is determined uniquely for each of the slave shelves based on the topology; and a management station, coupled to convey the management messages to the master shelf over a management network, responsive to the network-layer address of each of the slave shelves, so as to perform configuration and maintenance functions on one or more of the slave shelves.

25. Apparatus according to claim 24, wherein the master switching unit is adapted to analyze the system topology and to assign the network-layer address of each of the slave shelves automatically responsive to the analyzed topology.

26. Apparatus according to claim 24, wherein each of the slave shelves is adapted to determine a respective position of the shelf in the topology and to recognize its network-layer address responsive to its determined position.

27. Apparatus according to claim 24, wherein the topology comprises a plurality of daisy chains, over which the slave switching units are coupled to communicate with the master switching unit.

28. Apparatus according to claim 27, wherein the network-layer address of each of the slave shelves is determined uniquely by an identifying number of the chain in which the shelf is located and a position of the shelf in the chain.

29. Apparatus according to claim 24, wherein the network-layer address of each of the slave shelves comprises an Internet Protocol (IP) address.

30. Apparatus according to claim 29, wherein the high-speed network comprises an Asynchronous Transfer Mode (ATM) network.

31. A method for providing communication access, comprising:

linking a master switching unit on a master shelf to communicate with a high-speed network;

arranging a plurality of slave shelves in a given system topology with respect to the master shelf, so that a slave switching unit on each slave shelf communicates with the master switching unit and multiplexes among subscriber ports on the slave shelf so as to provide the subscribers with access to the high-speed network;

assigning to each slave shelf a unique network-layer address based on the topology, for receiving management instructions from the master switching unit;

conveying the management instructions from a management station to the master shelf over a management network, responsive to the network-layer address of each of the slave shelves, so as to perform configuration and maintenance functions on one or more of the slave shelves.

32. A method according to claim 31, wherein assigning the unique network-layer address comprises automatically analyzing the system topology and assigning the internal network-layer address responsive to the analyzed topology.

33. A method according to claim 31, wherein arranging the slave shelves in the topology comprises installing the shelves in a plurality of daisy chains, over which the slave switching units are coupled to communicate with the master switching unit.

34. A method according to claim 33, wherein assigning the network-layer address of each of the slave shelves comprises determining an identifying number of the chain in which the shelf is located and a position of the shelf in the chain, and assigning the internal network-layer address responsive to the determined number of the chain and the position of the shelf.

35. A method according to claim 31, wherein assigning the network-layer address to each slave shelf comprises assigning an Internet Protocol (IP) address.

36. A method according to claim 35, wherein the high-speed network comprises an Asynchronous Transfer Mode (ATM) network.

* * * * *